(12) United States Patent
Yamase et al.

(10) Patent No.: US 8,851,150 B2
(45) Date of Patent: Oct. 7, 2014

(54) ONE-PIECE SLIDE-ON SUNSHADE HOOK

(75) Inventors: Shinichi Yamase, Tochigi (JP); Konrad P. Szwed, Columbus, OH (US)

(73) Assignee: Honda Motor Co., Ltd.

( * ) Notice: Subject to any disclaimer, the term of this patent is extended or adjusted under 35 U.S.C. 154(b) by 0 days.

(21) Appl. No.: 13/570,616

(22) Filed: Aug. 9, 2012

(65) Prior Publication Data

US 2014/0041816 A1 Feb. 13, 2014

(51) Int. Cl.
*B60J 3/00* (2006.01)

(52) U.S. Cl.
USPC ........... 160/382; 296/97.9; 248/304; 248/690

(58) Field of Classification Search
USPC ............ 160/370.22, 370.21, 290.1; 296/97.1, 296/97.9, 97.7, 97.6, 97.8; 248/71, 301, 248/304, 690; 24/369, 373, 289
See application file for complete search history.

(56) References Cited

U.S. PATENT DOCUMENTS

| | | | |
|---|---|---|---|
| 4,112,550 A | 9/1978 | DeWitt et al. | |
| 4,364,598 A | 12/1982 | Viertel | |
| D321,639 S | 11/1991 | Adams | |
| 5,314,227 A * | 5/1994 | Weiland et al. | 296/97.9 |
| 5,358,299 A * | 10/1994 | Seto | 296/97.9 |
| 5,411,310 A * | 5/1995 | Viertel et al. | 296/97.9 |
| 5,484,183 A | 1/1996 | Rosa | |
| 5,507,545 A * | 4/1996 | Krysiak | 296/97.9 |
| 5,560,669 A * | 10/1996 | Gute | 296/97.9 |
| 5,673,742 A | 10/1997 | Gabb | |
| 5,758,851 A * | 6/1998 | Remmers | 248/251 |
| 5,918,927 A * | 7/1999 | Renahy et al. | 296/97.9 |
| 5,954,252 A | 9/1999 | Gebreselassie et al. | |
| 6,196,756 B1 * | 3/2001 | Leverger | 403/326 |
| 6,324,732 B1 * | 12/2001 | Arisaka et al. | 24/458 |
| 6,394,695 B1 * | 5/2002 | Chausset | 403/397 |
| 6,491,333 B2 * | 12/2002 | Ichikawa et al. | 296/97.9 |
| 6,659,521 B2 | 12/2003 | Hill et al. | |
| 6,726,165 B2 * | 4/2004 | Sawayanagi et al. | 248/224.8 |
| 6,773,051 B2 * | 8/2004 | Davey et al. | 296/97.7 |
| 6,799,743 B2 * | 10/2004 | Sawayanagi | 248/27.1 |
| 6,863,331 B2 * | 3/2005 | Beaver et al. | 296/97.9 |
| 6,880,877 B2 * | 4/2005 | Sawayanagi et al. | 296/97.9 |
| 7,189,112 B2 * | 3/2007 | Hamaguchi | 439/567 |
| 7,226,023 B2 * | 6/2007 | Banno et al. | 248/71 |
| 7,293,824 B2 * | 11/2007 | Dobson | 296/214 |
| 7,419,206 B2 * | 9/2008 | Slobodecki et al. | 296/97.9 |
| 7,438,341 B1 * | 10/2008 | Olson, Jr. | 296/97.9 |
| 7,575,267 B2 * | 8/2009 | Nakajima et al. | 296/97.9 |
| 7,798,552 B2 * | 9/2010 | Takai | 296/97.9 |
| 7,967,266 B2 * | 6/2011 | Lesecq et al. | 248/230.7 |
| 8,141,832 B2 * | 3/2012 | Chak | 248/226.11 |
| 2004/0159412 A1 | 8/2004 | Austin | |
| 2008/0141501 A1 * | 6/2008 | Kuroda | 24/297 |
| 2011/0154621 A1 * | 6/2011 | Ehrhardt et al. | 24/289 |
| 2012/0228896 A1 * | 9/2012 | Medlar et al. | 296/97.9 |

* cited by examiner

*Primary Examiner* — Katherine Mitchell
*Assistant Examiner* — Johnnie A Shablack
(74) *Attorney, Agent, or Firm* — Fay Sharpe LLP

(57) ABSTRACT

A sunshade hook assembly includes a body having a generally J-shaped hook. The hook has a first, proximal portion that merges into the body, and a second, distal portion forming an open-ended terminal end dimensioned to receive a rod of the associated sunshade. An attachment member extends from the body and includes a detent mechanism that requires a predetermined force for securing the body to an associated bracket.

14 Claims, 4 Drawing Sheets

ONE-PIECE SLIDE-ON SUNSHADE HOOK

BACKGROUND

The present disclosure relates to a sunshade assembly, and more particularly to a unitary or one-piece slide-on sunshade hook. It finds particular application in use with a bracket that extends from a door sash, for example, and eliminates the requirement for a cover piece, or additional components such as a post-like connection, connections held by fasteners or other movable elements, and will be described with particular reference thereto. However, it is to be appreciated that the present exemplary embodiment is also amenable to other like applications.

A typical sunshade assembly may include a sunshade screen that is retractably mounted on a roller. The roller is received in a vehicle door or side panel adjacent the lower edge or beltline of the window so that the flexible sunshade or sunscreen can be selectively extended to a deployed position for shading a window. The roller is usually concealed from view by a trim component which has a slit or opening through which the sunshade extends when deployed and retracted. When fully extended, a tab, rod, or finishing element provided along an upper edge of the sunshade is adapted for receipt in one or more hooks provided adjacent the upper portion of the window, i.e. along the header portion. It is common to employ a pair of brackets mounted at spaced locations adjacent an upper edge of the window to selectively secure the sunshade in the extended, deployed position.

A wide variety of hook assemblies are provided in various vehicles. The hook assemblies are, in turn, secured to the trim or sash in a variety of ways. For example, it is common to use a two piece clip in which a first portion receives the hook, and the first portion is separately secured to the door sash. In yet another arrangement, a clip arrangement is used and then an overlying cap is installed to hide the clip connection and improve the aesthetics. In still another arrangement, a fastener such as a screw secures the hook and subsequently a cap is required to overlie the fastener connection.

There are a number of reasons why the multi-component arrangement is undesirable. For example, there is a requirement to manufacture separate components. This also entails separate manufacturing equipment, molds, etc. In addition, separate inventory, assembly time, assembly cost, and/or color-matching depending on the design of the separate components, and tolerance/interfit between the separate components can be an issue.

Consequently, a need exists for a simplified hook that can be easily manufactured, installed without the use of tools, and that provides feedback to the installer indicating proper securing of the sunshade hook to the bracket. Moreover, the hook must conform to the adjacent vehicle components, and provide an aesthetically pleasing finish.

BRIEF DESCRIPTION

One embodiment of a sunshade hook assembly includes a body having a generally J-shaped hook. The hook has a first, proximal portion that merges into the body, and a second, distal portion forming an open-ended terminal end dimensioned to receive a rod of the associated sunshade. An attachment member extends from the body and includes a detent mechanism that requires a predetermined force for securing the body to an associated bracket.

The attachment member preferably includes first and second arms terminating in a spaced relation and that form a slot dimensioned for receipt over an associated bracket.

At least one of the arms includes an offset portion that forms at least a part of the detent mechanism.

The generally J-shaped hook curves about a first axis, and the attachment member slides relative to the associated bracket in a direction substantially parallel to the first axis.

The detent mechanism preferably has an axial dimension that is less than an associated opening in the bracket.

The arms are preferably configured to form a substantially T-shaped cavity that receives a corresponding, substantially T-shaped portion of the bracket.

The sunshade hook assembly is preferably a unitary, one-piece structure formed of a plastic material.

A first benefit relates to the one-piece structure, and eliminating issues associated with multiple components.

Another advantage resides in the ability to slide the hook into assembled position and avoid the use of a separate fastener to secure the hook to an associated bracket.

Yet another advantage is associated with the feedback to the installer indicating secure connection with the bracket.

Still another benefit relates to the improved appearance associated with the installed hook.

Still other benefits and advantages of the present disclosure will become apparent to those skilled in the art upon reading and understanding the following detailed description.

DETAILED DESCRIPTION

Figure 1:
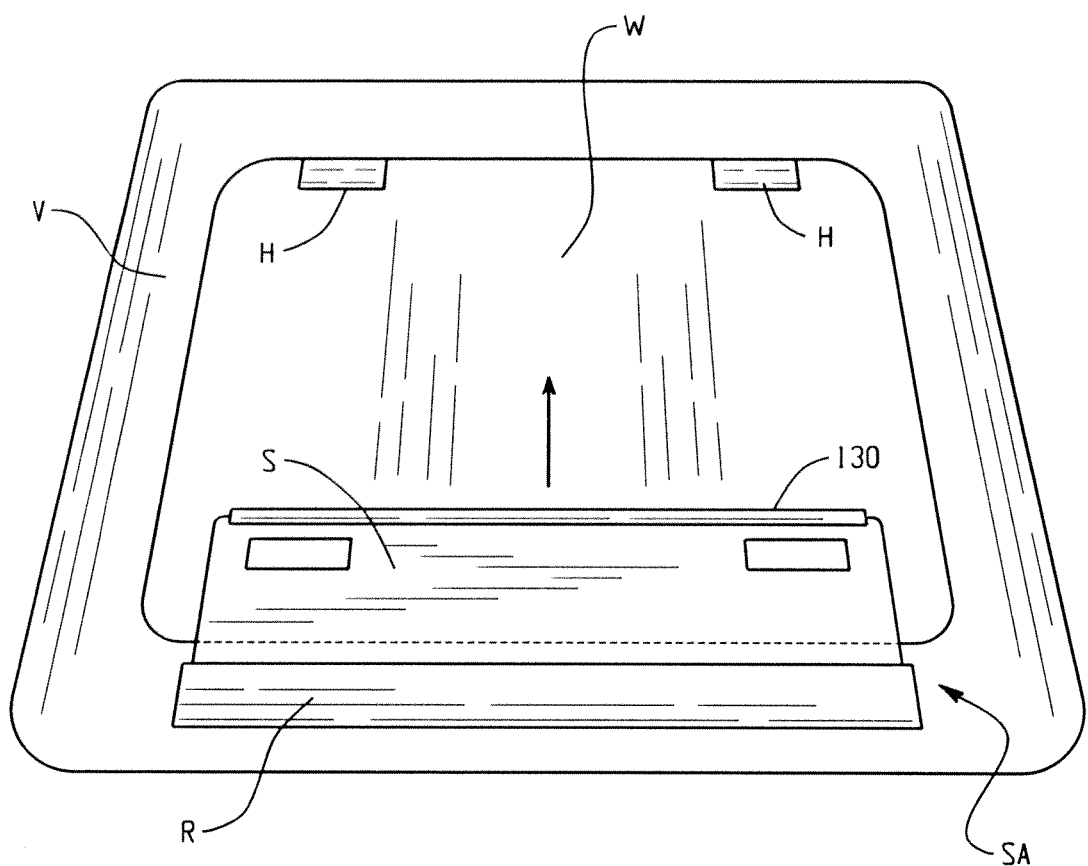
FIG. 1 is an exemplary door or side panel of an automotive vehicle that includes a sunshade for selectively covering the window.

FIG. 1 illustrates a sunshade assembly SA may include a sunshade screen S that is retractably mounted on a roller R. The roller R is received in a vehicle door or side panel V adjacent a lower edge or beltline of a window W. When retracted, the sunshade is wrapped around the roller with an upper edge extending outwardly through a slot. The flexible sunshade or sunscreen S can be selectively extended to an extended or deployed position for shading the window by pulling upwardly on the sunshade S and securing the sunshade to one or more hooks H that are mounted adjacent an upper or header portion of the window.

Figure 2:
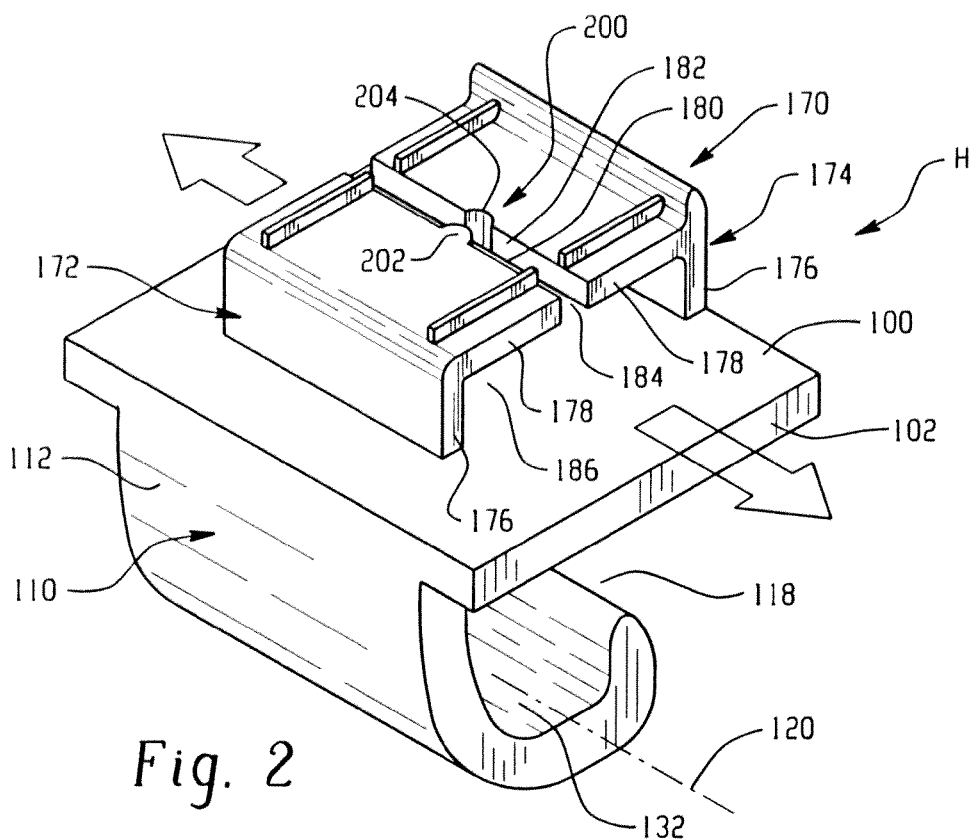
FIG. 2 is a perspective view of the one-piece sunshade hook of the present disclosure.
Figure 3:
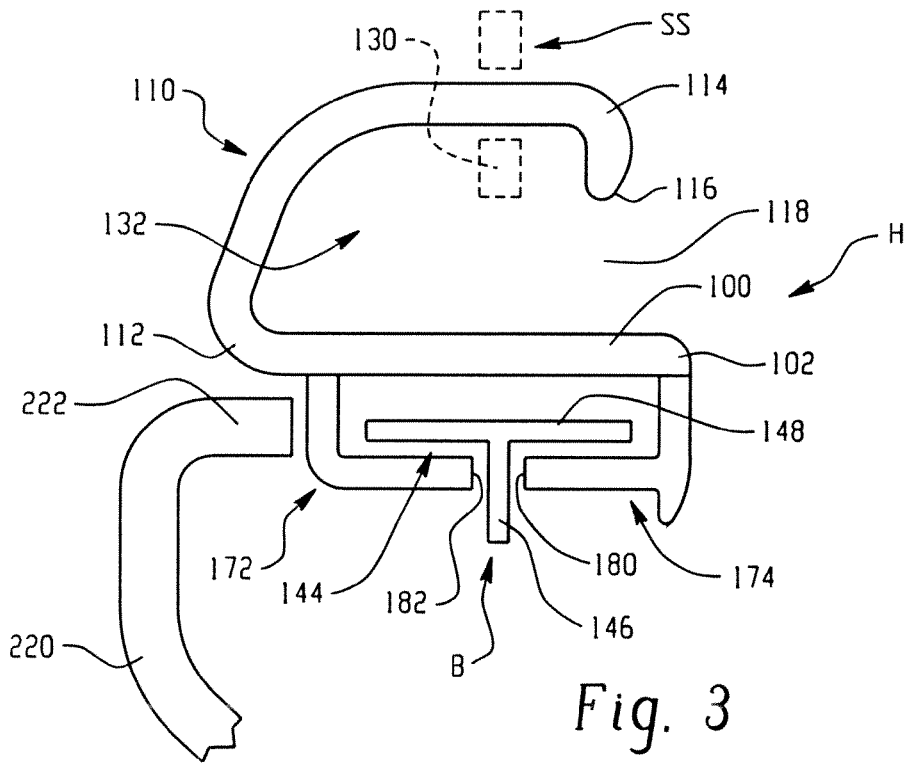
FIG. 3 is an elevational view of the hook assembled to the bracket and form fitting with an associated door sash.

FIGS. 2 and 3 illustrates one of the sunshade hook assemblies H of the present disclosure which in this embodiment is constructed from a molded plastic and is a unitary, one-piece component configured for sliding, mounting engagement with a bracket B (individually illustrated in FIGS. 4-5) that is secured to an automotive vehicle, and more particularly secured to the vehicle body adjacent the window. The hook assembly H has a body 100 which includes an enlarged generally planar portion 102 shown in this arrangement as having a generally rectangular or generally square-shaped configuration. Of course one skilled in the art will appreciate that the body 100 may adopt one of a wide array of configurations without departing from the scope and intent of the present disclosure.

Figure 6:
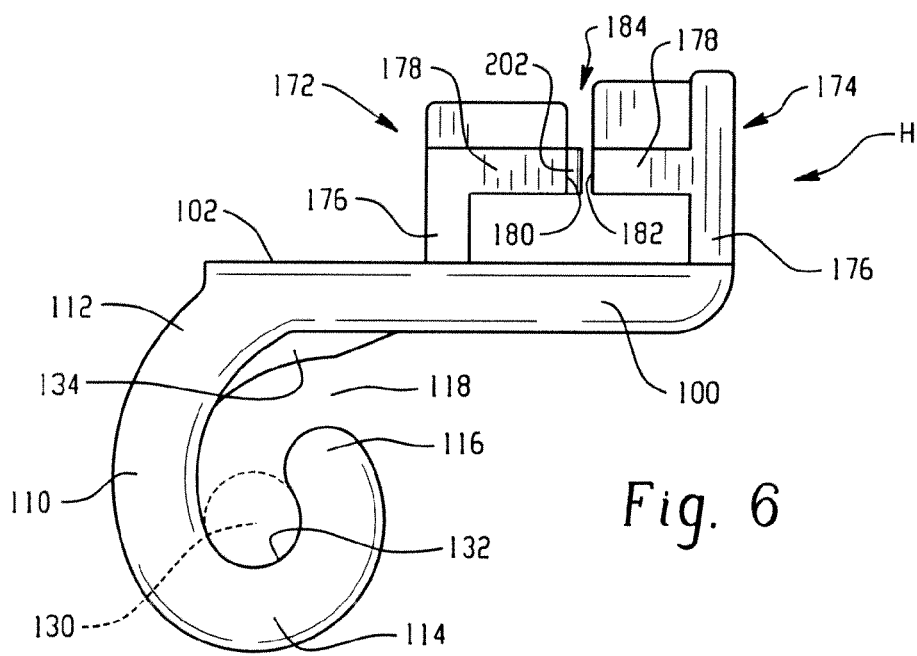
FIG. 6 an elevational view of the hook.

A generally J-shaped hook 110 extends outwardly from the body 100. For example, the J-shaped hook includes a first or proximal portion 112 that merges into the body 102. In the illustrated arrangement, the first portion 112 is disposed adjacent an edge of the body 102 so that a second or distal portion 114 is spaced from the body along the generally J-shaped configuration and terminal end 116 defines an opening 118 spaced from the body that is dimensioned to receive a portion of sunshade S therein. The terminal end 116 curves generally around an axis 120 and extends toward the body 100 and terminates at a predetermined dimension from the body to form the opening 118 that receives a portion of the sunshade S, e.g. a rod or tab 130 (see FIGS. 3 and 6) therethrough and allows the rod/tab 130 to be received in a bight 132 of the J-shaped hook. A biasing force imposed on the sunshade S, for example by a spring (not shown) associated with the roller, urges the rod/tab into the bight of the hook and prevents the rod/tab from being inadvertently removed from the J-shaped hook.

Figure 7:
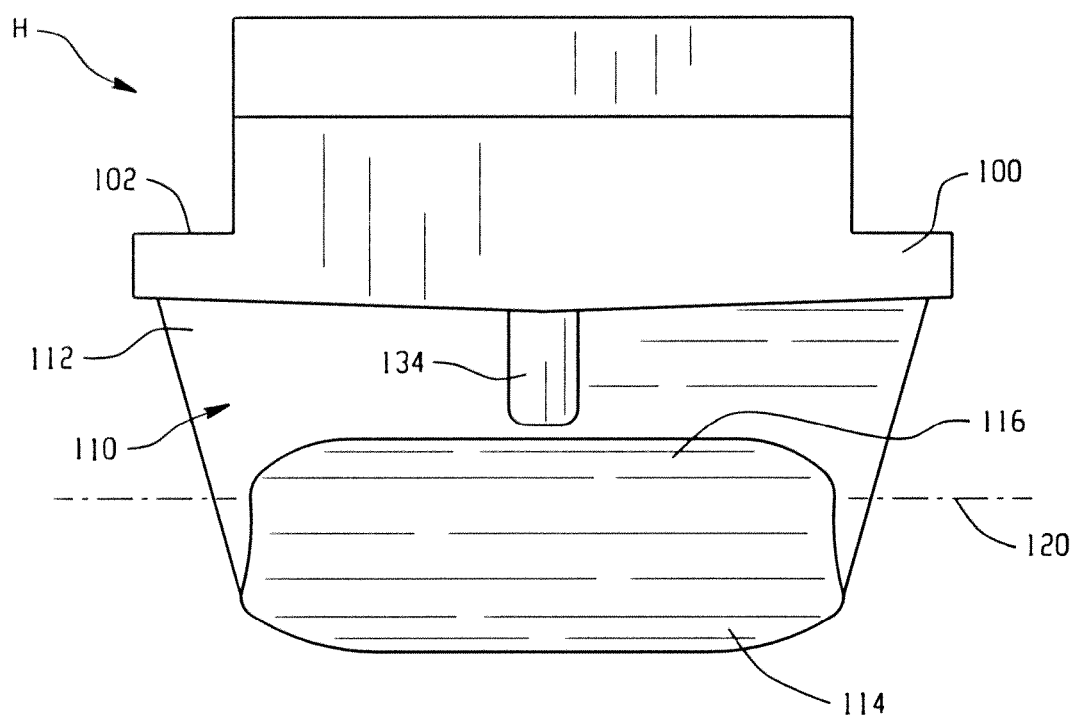
FIG. 7 is a front plan view of the hook.

In addition, rib 134 (FIGS. 6-7) may also be provided and extends from the interface of the hook and body 100 toward the bight cavity 132. The rib 134 serves to guide the rod/tab 130 into position in the cavity of the generally J-shaped hook, and also can serve as an interference surface against which the rod/tab 130 abuts and limits movement of the sunshade S when the sunshade is extended over the window. For example, wind forces from an open window that are imposed on the sunshade could result in back-and-forth movement of the rod/tab within the J-shaped hook 110 and against the body 100 of the hook assembly H. The rib 134 will aid in retaining the rod/tab 130 in place.

Figure 4:
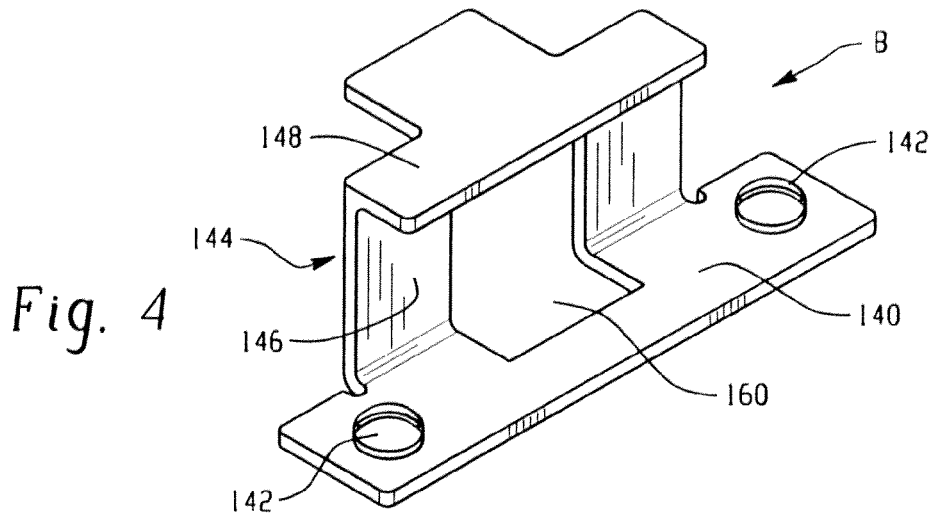
FIG. 4 is a perspective view of a preferred bracket.
Figure 5:
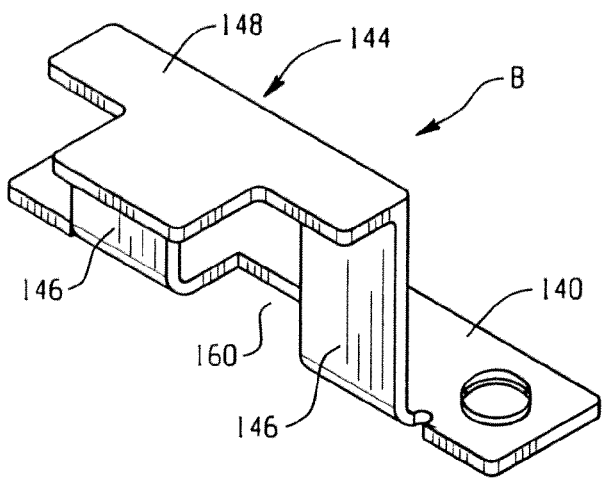
FIG. 5 is another perspective view of the bracket of FIG. 3.

With continued reference to FIG. 3, and additional reference to FIGS. 4 and 5, the bracket B in this arrangement has a first or generally planar mounting portion 140. In this embodiment, one or more fasteners 142 extend through corresponding openings in the mounting portion 140 to secure the bracket B to the vehicle. Extending outwardly from the mounting portion 140 of the bracket is a generally T-shaped mounting surface 144. In one exemplary form, the bracket mounting surface 144 includes a first or upright leg portion 146 and a second or perpendicular leg portion 148. Together, the first leg portion 146 and the second leg portion 148 define a generally T-shape extending outwardly from the mounting portion 140. In addition, an opening 160 is provided in the first leg portion 146. The opening is dimensioned to cooperate with the hook assembly H in a manner to be described in greater detail below.

More specifically, the hook assembly H has an attachment member 170 that includes first and second arms 172, 174 extending outwardly from the body 100. The arms 172, 174 are generally L-shaped and in this embodiment extend from an opposite surface of the generally planar portion 102 than the hook assembly. Each arm 172, 174 includes a first portion 176 extending generally perpendicular or outward from the generally planar portion 102, and a second portion 178 that extends substantially perpendicular to the first portion 176. Further, the second portions 178 of the respective attachment arms 172, 174 terminate in faces 180, 182 disposed in spaced relation to one another and that together form a slot or channel 184 therebetween. The slot 184 is dimensioned to receive the first leg portion 146 of the bracket and opens inwardly into the cavity 186 formed by the attachment arms 172, 174 that receives the second leg portion 148 of the bracket. Without limiting the present disclosure, a predetermined force on the order of a maximum of fifty (50) newtons is required to secure the hook assembly H to the bracket B. This force was measured in an environment of approximately 22 degrees C. at about 60% relative humidity; however, one skilled in the art will recognize that other force load magnitudes may be used without departing from the scope and intent of the present disclosure.

As noted above, the faces 180, 182 of the attachment arms 172, 174 are disposed in a generally parallel relation to define the slot 184 which, in turn, extends in parallel relation with the axis 120. In addition, the faces 180, 182 include a detent mechanism 200 defined by a protrusion 202 on one of the faces (shown here as face 180) and a recess 204 on the other face (shown here as face 182). The detent mechanism 200 is configured and dimensioned to cooperate with the opening 160 provided in the bracket. Particularly, the one-piece sunshade hook H is slid over the mounting surface 144 of the bracket B so that the first leg 146 extends through the slot 184 and the second leg 148 is captured beneath the attachment arm second portions 178. This sliding movement is in a direction (along an axial direction) that is substantially parallel to the axis 120 around which the hook H is curved. The protrusion 202 of the detent mechanism frictionally engages the first leg 146 and provides a limited resistance as the hook is advanced into the mounted position. Once the protrusion 202 is slid over the opening 160, the protrusion snaps into the opening and provides a detectable feedback to the assembler that the hook has been properly located and affixed relative to the bracket. Likewise, once the hook is mounted in the proper position, the receipt of the protrusion 202 in the opening 160 prevents inadvertent removal of the hook from the mounting bracket.

The detent assembly serves to prevent relative axial movement between the installed sunshade hook H and the bracket. Moreover, the hook(s) of the present disclosure is easily installed to the vehicle, typically along the header portion of the vehicle window thereby allowing the tab/rod 130 associated with the deployed sunshade to be received in the internal bight cavity of the J-shaped hook 110. Moreover, the receipt of the bracket within the cavity 186 assists in the reduced height profile of the bracket and hook. The generally planar platform 102 of the body 100 extends around the periphery and serves to "hide" from view the connection between the hook and the bracket when installed. As also illustrated in FIG. 3, a surface of the platform receives a sash garnish or trim element 220 and particularly a leg portion 222 thereof fits beneath the edge of the platform opposite from the hook 110 to provide an aesthetically pleasing, clean profile.

This written description uses examples to describe the disclosure, including the best mode, and also to enable any person skilled in the art to make and use the disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. It is also noted that each feature of each specific embodiment disclosed herein is not considered essential to that specific embodiment, and that features disclosed in one embodiment can be added or substituted with another embodiment.

The invention claimed is:
1. A sunshade hook assembly configured for mounting on an associated bracket, the sunshade hook assembly comprising:
 a body having a generally J-shaped hook extending therefrom that includes a first, proximal portion merging into the body and a second, distal portion forming an open- ended terminal end dimensioned to receive an associated rod of an associated sunshade;

an attachment member extending from the body including a detent mechanism that requires a predetermined force for securing the body to the associated bracket, the attachment member includes first and second arms terminating in spaced relation that form a slot dimensioned for receipt over the associated bracket and wherein the slot extends in a substantially perpendicular direction to an insertion direction of the associated rod of the associated sunshade into the generally J-shaped hook, the detent mechanism formed in at least one of terminal ends of the first and second arms, and including a protrusion that extends inwardly into the slot from one of the first and second arms to provide a limited resistance to relative movement between the attachment member and the associated bracket.

2. The assembly of claim 1 wherein at least one of the arms includes an offset portion that forms at least a part of the detent.

3. The assembly of claim 1 wherein the first arm includes an offset portion that forms at least a part of the detent and the second arm includes an offset portion that forms a portion of the detent.

4. The assembly of claim 1 wherein the attachment member includes first and second arms form a generally T-shaped cavity dimensioned for receipt over an associated generally T-shaped bracket.

5. The assembly of claim 1 wherein the J-shaped hook curves about a first axis, and the attachment member slides relative to the associated bracket in a direction substantially parallel to the first axis.

6. The assembly of claim 5 wherein the detent has an axial dimension that is slightly less than an associated opening in the associated bracket for receipt therein and securing the hook assembly.

7. In combination, a sunshade hook assembly and bracket for use with an associated sunshade, the combination comprising:

the hook assembly including a body having an attachment member and a generally J-shaped hook extending from generally opposite sides of the body, the attachment member including a detent mechanism that operatively engages the bracket, the attachment member includes first and second arms having terminal ends disposed in spaced relation forming a slot dimensioned to receive a leg of the bracket therethrough, and the hook dimensioned to receive a rod from the associated sunshade therein, the slot extending in a substantially perpendicular direction to an insertion direction of the associated rod of the associated sunshade into the generally J-shaped hook; and the bracket including an opening dimensioned to receive the detent mechanism and oriented to provide a limited resistance to relative movement between the attachment member and the bracket and thereby requiring a predetermined force for securing the hook assembly to the bracket in a direction parallel to the slot.

8. The combination of claim 7 wherein the hook assembly is formed from a plastic material.

9. The combination of claim 7 wherein arms are configured to form a substantially T-shaped cavity that receives a substantially T-shaped portion of the bracket.

10. The combination of claim 9 wherein a leg of the T-shaped portion of the bracket includes the opening so that relative sliding movement of the hook assembly relative to the bracket locates the detent mechanism within the opening.

11. A sunshade hook and bracket assembly for use with an associated sunshade comprising:

a generally J-shaped hook assembly having a body with an attachment member that includes first and second arms terminating in spaced relation that form a slot that extends in a substantially perpendicular direction to an insertion direction of an associated rod of the associated sunshade into the generally J-shaped hook, the first and second arms of the attachment member form a substantially T-shaped cavity that receives a substantially T-shaped portion of the bracket, and a detent mechanism including a protrusion extending at least partially into the slot between terminal ends of the first and second arms of the attachment member; and a bracket including an opening dimensioned for operatively receiving and engaging the protrusion of the detent mechanism and providing a limited resistance to sliding movement between the hook assembly and the bracket in a direction substantially parallel to the slot.

12. The assembly of claim 11 wherein the J-shaped hook curves about a first axis, and the attachment member slides relative to the associated bracket in a direction substantially parallel to the first axis.

13. The assembly of claim 11 wherein at least one of the arms includes an offset portion that forms at least a part of the detent mechanism.

14. The assembly of claim 13 wherein the other of the arms includes an offset portion that also forms a portion of the detent mechanism.

* * * * *